US012651956B2

(12) United States Patent
Zhang et al.

(10) Patent No.: US 12,651,956 B2
(45) Date of Patent: Jun. 9, 2026

(54) POWER ELECTRONIC TRANSFORMER

(71) Applicants:Shanghai Jiao Tong University,
Shanghai (CN); **Delta Electronics
(Shanghai) Co., Ltd.**, Shanghai (CN)

(72) Inventors: Jianwen Zhang, Shanghai (CN);
Jianqiao Zhou, Shanghai (CN); **Han
Wang, Shanghai (CN); Gang Shi**,
Shanghai (CN); Xu Cai, Shanghai (CN)

(73) Assignees: Shanghai Jiao Tong University,
Shanghai (CN); **Delta Electronics
(Shanghai) Co., Ltd.**, Shanghai (CN)

( * ) Notice: Subject to any disclaimer, the term of this
patent is extended or adjusted under 35
U.S.C. 154(b) by 209 days.

(21) Appl. No.: 18/762,626

(22) Filed: Jul. 2, 2024

(65) Prior Publication Data

US 2025/0167662 A1     May 22, 2025

(30) Foreign Application Priority Data

Nov. 22, 2023    (CN) .......................... 202311569718.8

(51) Int. Cl.
H02M 1/00 (2007.01)
H02M 5/458 (2006.01)
H02M 7/219 (2006.01)

(52) U.S. Cl.
CPC ......... H02M 1/007 (2021.05); H02M 5/4585
(2013.01); H02M 7/219 (2013.01)

(58) Field of Classification Search
CPC .......... H02M 5/40; H02M 5/42; H02M 5/453;
H02M 7/7575; H02M 5/458; H02M 5/45;
(Continued)

(56) References Cited

U.S. PATENT DOCUMENTS 9,190,930 B2 * 11/2015 Inoue .................. H02M 7/4835
9,793,827 B2 * 10/2017 Garces ................ H02M 1/0043
(Continued)

FOREIGN PATENT DOCUMENTS

CN        102097966 A    6/2011
CN        203574386 U    4/2014
(Continued)

OTHER PUBLICATIONS

Zhang Jianwen et al., "A Novel Multiple-Medium-AC-Port Power
Electronic Transformer," IEEE Transactions on Industrial Electron-
ics, IEEE Service Center, Piscataway, NJ, USA, vol. 71, No. 7, Jul.
1, 2024 (Jul. 1, 2024), pp. 6568-6578.
(Continued)

*Primary Examiner* — Jeffrey A Gblende
(74) *Attorney, Agent, or Firm* — CKC & Partners Co.,
LLC

(57)            ABSTRACT
A power electronic transformer includes three modules, the
three modules each including: a first submodule; a second
submodule; and a third submodule including a first power
conversion module including N first power conversion units
having input ports connected to the N output ports of the first
submodule in one-to-one correspondence, and a second
power conversion module including M first power conver-
sion units having input ports connected to the M output ports
of the second submodule in one-to-one correspondence, the
first input port of the first submodule of the three modules
has one terminal connected to three phases of a first three-
phase alternating current in one-to-one correspondence, and
the other terminal connected to three phases of a second
three-phase alternating current in one-to-one correspon-
dence, output ports of the N first power conversion units are
connected in parallel to output ports of the M first power
conversion units.

12 Claims, 10 Drawing Sheets

(58) Field of Classification Search
CPC .. H02M 5/4585; H02M 5/4505; H02M 5/451; H02M 5/452; H02M 5/447; H02M 5/456; H02M 1/12; H02M 1/4266; H02M 2001/123; H02M 7/53; H02M 7/537; H02M 7/5387; H02M 7/53871; H02M 7/53873; H02M 7/53875; H02M 7/53876; H02M 1/32; H02M 1/322; H02M 3/3155; H02M 3/158; H02M 3/33507; H02M 3/33546; H02M 7/1557; H02M 7/1626; H02M 1/4208; H02M 7/12; H02M 7/219; H02M 7/151; H02M 1/4233; H02M 7/217; H02M 1/08; H02M 7/1552; H02M 7/1623; H02M 1/4225; H02M 3/33592; H02M 3/073; H02M 3/10; H02M 3/135; H02M 3/137; H02M 7/10; H02M 7/00; H02M 7/06; H02M 7/064; H02M 7/068; H02M 3/156; H02M 1/083; H02M 1/14; H02M 1/4216; H02H 7/261; H02H 7/268; H02J 3/36; H02J 3/01; H02J 7/12; G05F 1/30; G05F 1/33; G05F 1/32; G05F 1/34; G05F 1/38; G05F 1/52
See application file for complete search history.

(56) References Cited

U.S. PATENT DOCUMENTS

| | | | |
|---|---|---|---|
| 11,088,655 | B2 | 8/2021 | Zhuang et al. |
| 11,431,263 | B2 | 8/2022 | Zhang et al. |
| 12,212,221 | B2 * | 1/2025 | Huang .................... H02M 3/01 |
| 2013/0076143 | A1 | 3/2013 | Gu |
| 2018/0262117 | A1 * | 9/2018 | Lu .................... H02M 3/33571 |
| 2019/0052177 | A1 | 2/2019 | Lu et al. |
| 2022/0302848 | A1 | 9/2022 | Yu et al. |
| 2023/0231466 | A1 | 7/2023 | Dong et al. |

FOREIGN PATENT DOCUMENTS

| | | |
|---|---|---|
| CN | 113364311 A | 9/2021 |
| CN | 113595431 A | 11/2021 |
| CN | 115635868 A | 1/2023 |
| CN | 116207741 A | 6/2023 |
| EP | 3660997 B1 | 11/2021 |
| WO | 2015105081 A1 | 7/2015 |

OTHER PUBLICATIONS

Ma Dajun et al., "Multiport AC-AC-DC Converter for SNOP With One Medium-Frequency Transformer," CPSS Transactions on Power Electronics and Applications, vol. 7, No. 4, Dec. 1, 2022 (Dec. 1, 2022), pp. 374-385.

H. Iman-Eini et al., "A modular power electronic transformer based on a cascaded H-bridge multilevel converter," Electric Power Systems Research, Elsevier, Amsterdam, NL, vol. 79, No. 12, Dec. 1, 2009 (Dec. 1, 2009), pp. 1625-1637.

Xu Fei et al., "A fast simulation model of cascaded H bridge-power electronic transformer," IECON 2019 45th Annual Conference of the IEEE Industrial Electronics Society, vol. 1, Oct. 14, 2019 (Oct. 14, 2019), pp. 6755-6760.

* cited by examiner

10

<u>30</u>

POWER ELECTRONIC TRANSFORMER

CROSS-REFERENCE TO RELATED APPLICATIONS

This non-provisional application claims priority under 35 U.S.C. § 119(a) on patent application No. 202311569718.8 filed in P.R. China on Nov. 22, 2023, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND OF THE DISCLOSURE

1. Field of the Disclosure

The disclosure relates to the field of flexible interconnection of an AC/DC power network and power electronic technology in a power system, and particularly to a power electronic transformer.

2. Related Art

Recently, the growing environmental crisis and the shortage problem of fossil energy promote the pace of change in energy consumption structure, and new clean renewable energy sources representative of wind energy and solar energy gradually replace the fossil energy as dominant energy sources. In the background of energy structure transformation and new infrastructure layout, distributed power sources such as photovoltaics, wind power and energy storage will be connected to the power network on a large scale, and large power DC loads such as electric vehicle supercharger stations and data centers are also widely connected to the power distribution network, causing profound influence on development trend of the future power distribution network: 1) the traditional AC power distribution network mainly relies on one-way powering, power distribution primary control equipment (on-load voltage regulators, capacitors, interconnection switches, etc.) lack regulation and control capability, and with wide connection of new source loads, the power distribution network has problems of poor flexibility in operation and unbalance of feeder loads; 2) with scale application of techniques such as new source load storage and supercharger stations, the power distribution network faces the development trend of a large capacity, and it is difficult for the single distribution network feeder capacity to support connection of super large power DC source loads; 3) since development and construction of the cities are expanding, when facing limits of urban development and power supply corridor, it is difficult for the power distribution network to achieve rapid reformation of capacity expansion and large scale energy storage configuration, and it is difficult to face high-speed wide electrification progress.

To solve the problems, interconnection and mutual assistance are achieved using multiple AC feeder lines, joint supply to low voltage DC users may be achieved fully using a residual capacity of the connected feeder lines, where the low voltage is less than 1500V, and power interaction between different feeder lines may be achieved using real-time performance and rapidity of control of the power electronic transformer, thereby solving the problem of decrease of an utilization rate of the equipment and the feeder lines caused by dynamic unbalance of distribution of loads in space. Currently, scholars provide a multiple medium voltage AC port solid-state transformer and a method of controlling the same. The solution forms a common DC bus using small power single phase converters, and then achieves joint supply to a low voltage DC bus by connecting a Cascaded H-Bridge Power Electronics Transformer (CHB-PET), but a common DC bus voltage of a series loop formed in a 10 KV AC power distribution network reaches 2500V, and a rated voltage of the switching device is typically twice the DC bus voltage. Since the existing conventional IGBT voltage withstand level is only about 600V to about 1700V, the solution has a large limit in selection of devices, is hard to satisfy low cost and large-scale promotion and application of the power distribution network, and also hard to be applied to a higher voltage level power distribution network.

Therefore, it is required to provide a new solution, which can solve the problem of voltage withstand level of the switching devices, and also shall ensure that the solution can combine multiple AC feeder lines to achieve joint supply to the low voltage DC bus, where the low voltage is less than 1500V.

SUMMARY OF THE DISCLOSURE

An object of this part is to summarize some aspects of the embodiments of the disclosure and briefly introduce some preferable embodiments. In this part, the Abstract and the title of the present application, there may be some simplifications or omissions to avoid ambiguity of the object of this part, the Abstract and the title, and such simplifications or omissions cannot be used to limit scope of the disclosure.

Considering of the existing problems, the disclosure provides a power electronic transformer, which solves the original problem of insufficient of voltage withstand level of the devices due to a large common DC bus voltage of the multiple medium voltage AC port solid-state transformer, and can be applied to a high-voltage power distribution network by increasing the number of cascaded small power second submodules in a flexible interconnection module with multiple medium voltage AC ports.

To solve the technical problem, the disclosure provides the following technical solution: a power electronic transformer, including three modules, the three modules each including: a first submodule including a first input port and N output ports, where N is an integer greater than 0; a second submodule including a first input port and M output ports, where M is an integer greater than 0; and a third submodule including a first power conversion module and a second power conversion module, the first power conversion module includes N first power conversion units having input ports connected to the N output ports of the first submodule in one-to-one correspondence, the second power conversion module includes M first power conversion units having input ports connected to the M output ports of the second submodule in one-to-one correspondence, the first input port of the first submodule of the three modules has one port connected to three phases of a first three-phase alternating current in one-to-one correspondence, and the other port connected to three phases of a second three-phase alternating current in one-to-one correspondence, the first input port of the second submodule of the three modules has one port connected to three phases of the first three-phase alternating current in one-to-one correspondence, and the other port connected to a neutral point, output ports of the N first power conversion units of the three modules are connected in parallel to output ports of the M first power conversion units to form a DC bus for powering a load.

Advantageous effects of the disclosure are as follows: the first submodule in the disclosure provides multiple AC ports, achieves interconnection between the respective AC ports, and can make decoupling control of powers between the feeder lines by regulating a magnitude of series voltage sources to achieve interconnection and mutual assistance of the AC ports, thereby facilitating efficient operation of the power distribution network, and flexibly expandable, flexibly controllable and control decoupling operation of the multiple ports; in the disclosure, DC sides of the second submodule and the first submodule are connected to one end of the third submodule, and the other end of the third submodule is connected in parallel to form a low voltage DC bus, which achieves joint supply to the low voltage DC side, and improves operational reliability of the low voltage DC power distribution network, where the low voltage is 1500V; the first submodule in the disclosure uses modular design, which may achieve expansion of the AC ports by increasing the number of SCHBs, and achieve rapidity and economy of expansion of the AC ports; the SCHBs in the disclosure use small power cascaded full bridge design, which reduces a voltage level of the DC side, such that the devices can select a lower voltage withstand level, so as to facilitate more economical and safer operation of the power distribution network; the SCHBs in the disclosure enable the disclosure to be applied to a power distribution network with a higher voltage level by the way of increasing cascaded full bridges.

BRIEF DESCRIPTION OF THE DRAWINGS

In order to clearly explain the technical solution in the embodiments of the disclosure, hereinafter the accompanying drawings used in description of the embodiments are briefly introduced, and obviously, the accompanying drawings in the following description are only some embodiments of the disclosure. For those of ordinary skill in the art, other accompanying drawings can be obtained according to these accompanying drawings on the premise of not paying creative effort, wherein.

DETAILED EMBODIMENTS OF THE DISCLOSURE

Figure 1:
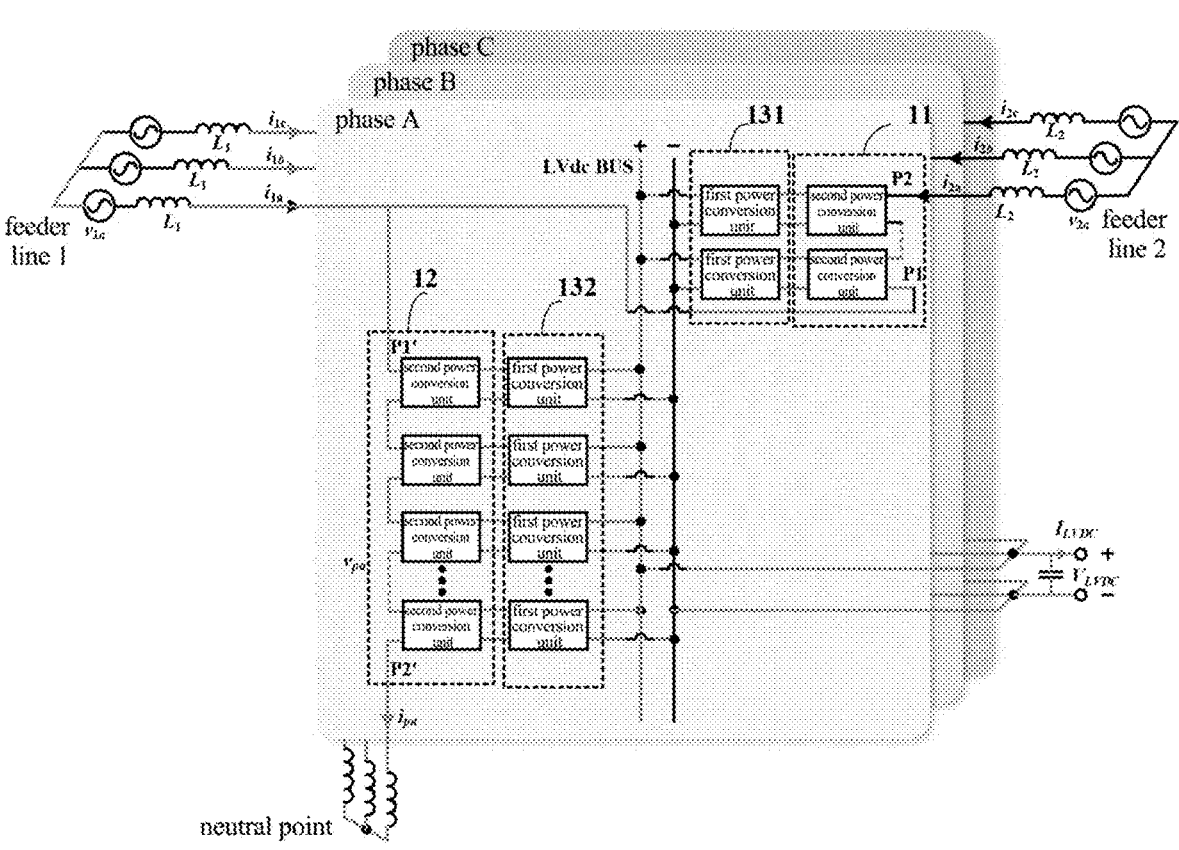
FIG. 1 is a structural diagram of a power electronic transformer provided in a first embodiment of the disclosure.

To make the object, features and advantages of the disclosure more apparent, hereinafter the detailed embodiments of the disclosure are explained in detail with reference to the accompanying drawings, and obviously, the described embodiments are a part of the embodiments of the disclosure, not all embodiments. Based on the embodiments in the disclosure, all other embodiments obtained by those of ordinary skill in the art without any creative effort shall be within the scope of protection of the disclosure.

Many details are set forth in the following description to fully understand the disclosure, but the disclosure also can be implemented using other ways different from those described here, and those skilled in the art can make similar promotions without departing from essence of the disclosure, so the disclosure is not limited to the following detailed embodiments as disclosed.

Secondly, reference to "one embodiment" or "an embodiment" here refers to particular feature, structure or characteristic that can be included in at least one implementation of the disclosure. "In one embodiment" in different places of the specification does not refer to the same embodiment, or the embodiment that is separately or selectively excluded from other embodiments.

The disclosure is described explicitly with reference to the schematic diagrams, when describing the embodiments of the disclosure, for sake of explanation, it means that the cross-section diagram of the device structure is not locally enlarged according to a general scale, and the schematic diagrams are only exemplary, and shall not limit the scope of protection of the disclosure. Moreover, in actual production, it shall include three-dimensional space dimensions of length, width and height.

Meanwhile, in the description of the disclosure, it shall be noted that orientation or positional relations indicated by the terms "upper, lower, inner and outer" are orientation or positional relations shown in the drawings, and only for convenience of describing the disclosure and simplifying the description, instead of indicating or suggesting that the referred device or element must have specific orientation, is constructed and operated in specific orientation, so they cannot be understood as limit to the disclosure. Furthermore, the term "first, second or third" is only for the purpose of description, and cannot be understood to indicate or suggest the relative importance.

The terms "mount, link and connect" shall be understood in a broad sense, unless the disclosure clearly specifies and defines otherwise, for example, being fixedly connected, detachably connected or integrally connected, also being mechanically connected, electrically connected or directly connected, being indirectly linked by an intermediate medium, and also communication inside two elements. For those of ordinary skill in the art, specific meaning of the terms in the disclosure can be understood depending on specific situations.

Hereinafter the technical solution of the disclosure is further explained with reference to the accompanying drawings, but the disclosure is not limited thereto, and any modifications or equivalent replacements to the technical solution of the disclosure shall all fall into the scope of protection of the disclosure without departing from spirit and scope of the disclosure.

FIG. 1 is a structural diagram of a power electronic transformer 10 provided in a first embodiment of the disclosure. As shown in FIG. 1, the power electronic transformer 10 includes three modules, which correspond to phase A, phase B and phase C, respectively, and three modules each includes three submodules, which are a first submodule 11, a second submodule 12 and a third submodule, respectively. The first submodule 11 includes a first input port and N output ports, where N is an integer greater than 0, the second submodule 12 includes a first input port and M output ports, where M is an integer greater than 0, and the third submodule includes a first power conversion module 131 and a second power conversion module 132.

As shown in FIG. 1, the first power conversion module 131 includes N first power conversion units having input ports connected to the N output ports of the first submodule 11 in one-to-one correspondence, and the second power conversion module 132 includes M first power conversion units having input ports connected to the M output ports of the second submodule 12 in one-to-one correspondence. The first input port of the first submodule 11 of the three modules has one terminal P1 connected to three phases of a first three-phase alternating current in one-to-one correspondence, and the other terminal P2 connected to three phases of a second three-phase alternating current in one-to-one correspondence. Referring to FIG. 1, the first three-phase alternating current corresponds to feeder line 1, and the second three-phase alternating current corresponds to feeder line 2. The first input port of the second submodule 12 of the three modules has one terminal P1' connected to three phases of the first three-phase alternating current in one-to-one correspondence, and the other terminal P2' connected to a neutral point. Output ports of the N first power conversion units are connected in parallel to output ports of the M first power conversion units to form a low voltage DC bus for powering a load.

Continuing to refer to FIG. 1, the first submodule 11 includes N second power conversion units with input ports connected in series to form the first input port of the first submodule 11, and output ports to form the N output ports of the first submodule 11. The second submodule 12 includes M second power conversion units with input ports connected in series to form the first input port of the second submodule 12, and output ports to form the M output ports of the second submodule 12.

Figure 2:
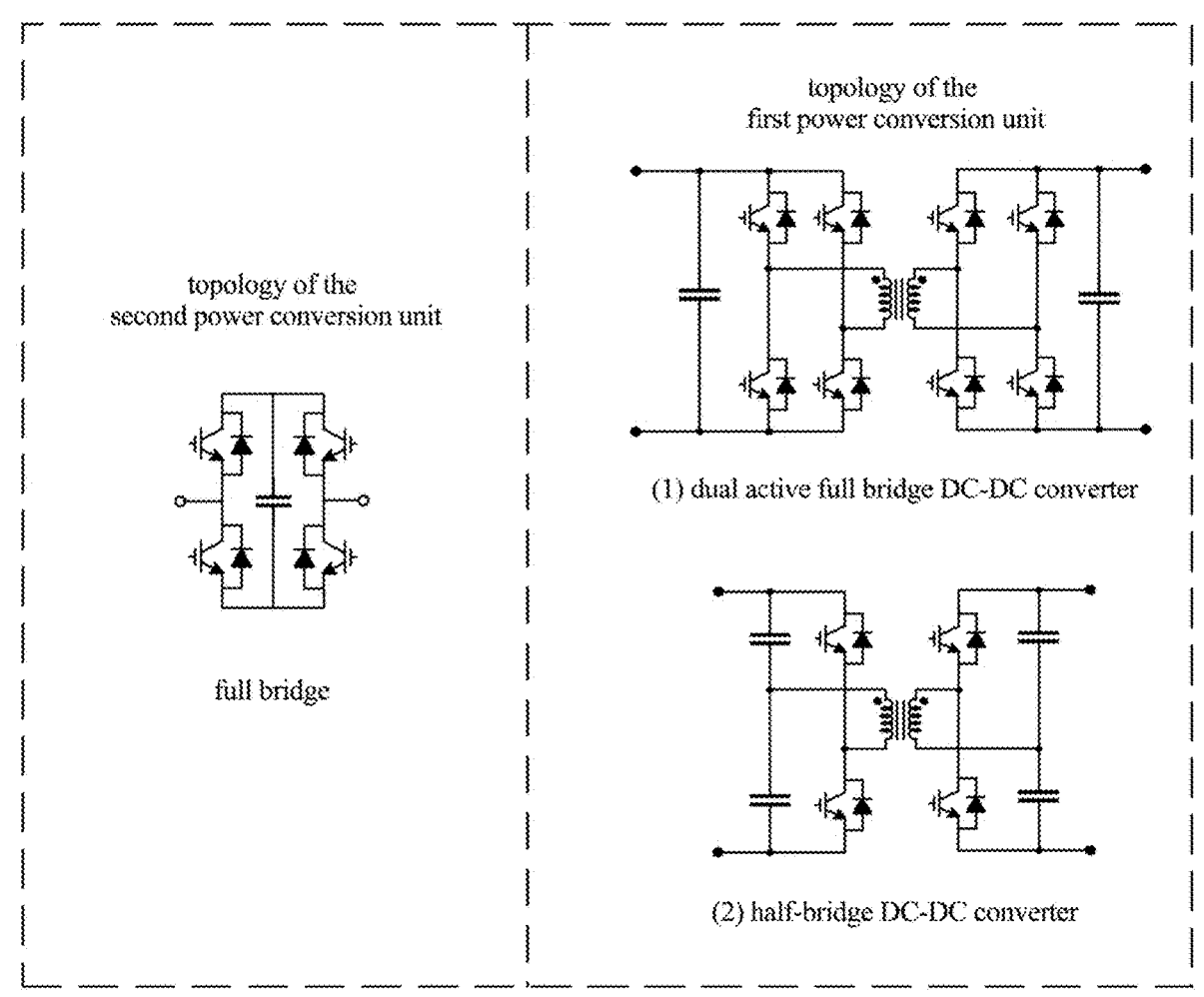
FIG. 2 is an exemplary schematic diagram of typical topologies of first power conversion units and second power conversion units of the power electronic transformer provided in the first embodiment of the disclosure.

FIG. 2 is an exemplary schematic diagram of typical topologies of first power conversion units and second power conversion units of the power electronic transformer 10 provided in the first embodiment of the disclosure. As shown in FIG. 2, the first power conversion units are isolated DC-DC converters, which have medium-high frequency isolation transformers in the middle. Further, the first power conversion units are isolated bidirectional DC-DC converters, and the topology is dual active full bridge DC-DC converters or half-bridge DC-DC converters. The second power conversion units are full bridge converters, and the second submodule 12 formed by M cascaded full bridge converters is voltage source converters. Referring to FIGS. 1 and 2, each of the second conversion units of the first submodule 11 is connected to the low voltage DC bus through one first power conversion unit, and each of the second conversion units of the second submodule 12 is connected to the low voltage DC bus through one first power conversion unit.

Figure 3:
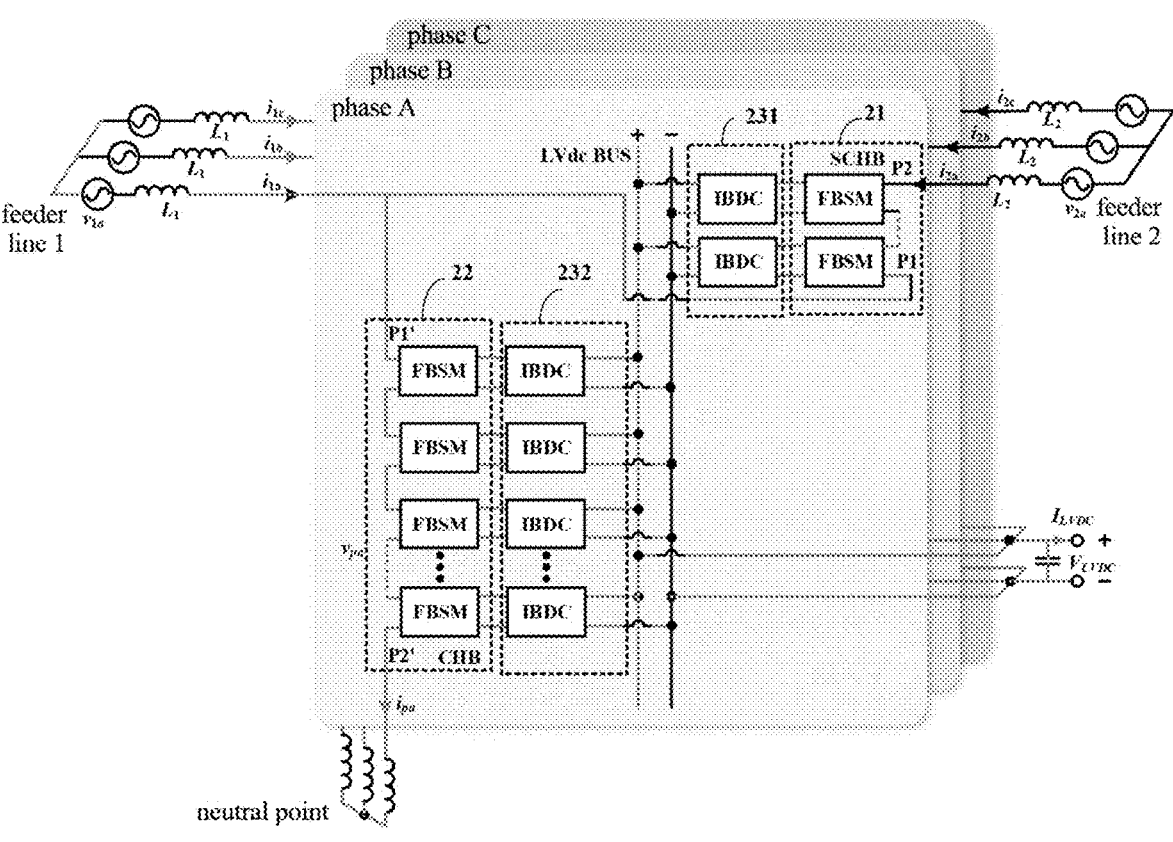
FIG. 3 is a structural diagram of a power electronic transformer provided in a second embodiment of the disclosure.

FIG. 3 is a structural diagram of a power electronic transformer 20 provided in a second embodiment of the disclosure. As shown in FIG. 3, the power electronic transformer 20 includes three modules, which correspond to phase A, phase B and phase C, respectively, and the three modules each includes three submodules, which are a first submodule 21, a second submodule 22 and a third submodule, respectively. The first submodule 21 includes a first input port and N output ports, where N is an integer greater than 0, the second submodule 22 includes a first input port and M output ports, where M is an integer greater than 0, and the third submodule includes a first power conversion module 231 and a second power conversion module 232.

The first power conversion module 231 includes N first power conversion units having input ports connected to the N output ports of the first submodule 21 in one-to-one correspondence, and the second power conversion module 232 includes M first power conversion units having input ports connected to the M output ports of the second submodule 22 in one-to-one correspondence. The first input port of the first submodule 21 of the three modules has one terminal P1 connected to the feeder line 1 in one-to-one correspondence, and the other terminal P2 connected to the feeder line 2 in one-to-one correspondence, and the first input port of the second submodule 22 has one terminal P1' connected to the feeder line 1 in one-to-one correspondence, and the other terminal P2' connected to a neutral point. Output ports of the N first power conversion units are connected in parallel to output ports of the M first power conversion units to form a low voltage DC bus for powering a load. The power electronic transformer 20 can achieve power flow control of two feeder lines, and a topology of low voltage DC joint powering devices and system connection.

The first submodule 21 includes N second power conversion units having input ports connected in series to form the first input port of the first submodule 21, and output ports to form the N output ports of the first submodule 21. The second submodule 22 includes M second power conversion units having input ports connected in series to form the first input port of the second submodule 22, and output ports to form the M output ports of the second submodule 22. In this embodiment, the first power conversion units are isolated bidirectional DC-DC converters (hereinafter referred to as IBDC), and the second power conversion units are full bridge sub-modules (hereinafter referred to as FBSM). The first submodule 21 is formed of N full bridge sub-modules (FBSM) cascaded, and hereinafter the N cascaded full bridge sub-modules (FBSM) included in the first submodule 21 are referred to as series cascaded H-bridges (SCHB). The second submodule 22 is formed by M full bridge sub-modules (FBSM) cascaded, and hereinafter the second submodule 22 is referred to as cascaded H-bridges (CHB).

In order to satisfy system level energy balance, the power electronic transformer satisfies the following power equation:

$$\sum_{k=1}^{l} P_k = P_L$$

wherein $P_k$ is an active power expression of a feeder line k of the power electronic transformer, where $1 \leq k \leq l$, $l \geq 2$, and $P_L$ is a low voltage DC port power of the power electronic transformer.

Further, combining with the power electronic transformer 10 shown in FIG. 1, the power equation satisfies:

$$P_1 = P_L - \sum_{k=2}^{l} P_k + P_{loss}$$

wherein $P_1$ is an active power expression of the feeder line 1 of the power electronic transformer, $P_k$ is an active power expression of the feeder line k of the power electronic transformer, where $2 \leq k \leq l$, $l \geq 2$, $P_L$ is a low voltage DC port power of the power electronic transformer, and $P_{loss}$ is active loss of the system.

The power electronic transformer 20 provided in the disclosure further includes a controller (not shown) for executing a control method, and achieving active control of active powers and reactive powers on the feeder lines by controlling equivalent voltage AC components connected in series to the feeder lines. The control method includes a power flow control loop, a cascaded full bridge control loop, a SCHB voltage balance control loop and a low voltage DC bus voltage balance control loop.

Figure 4:
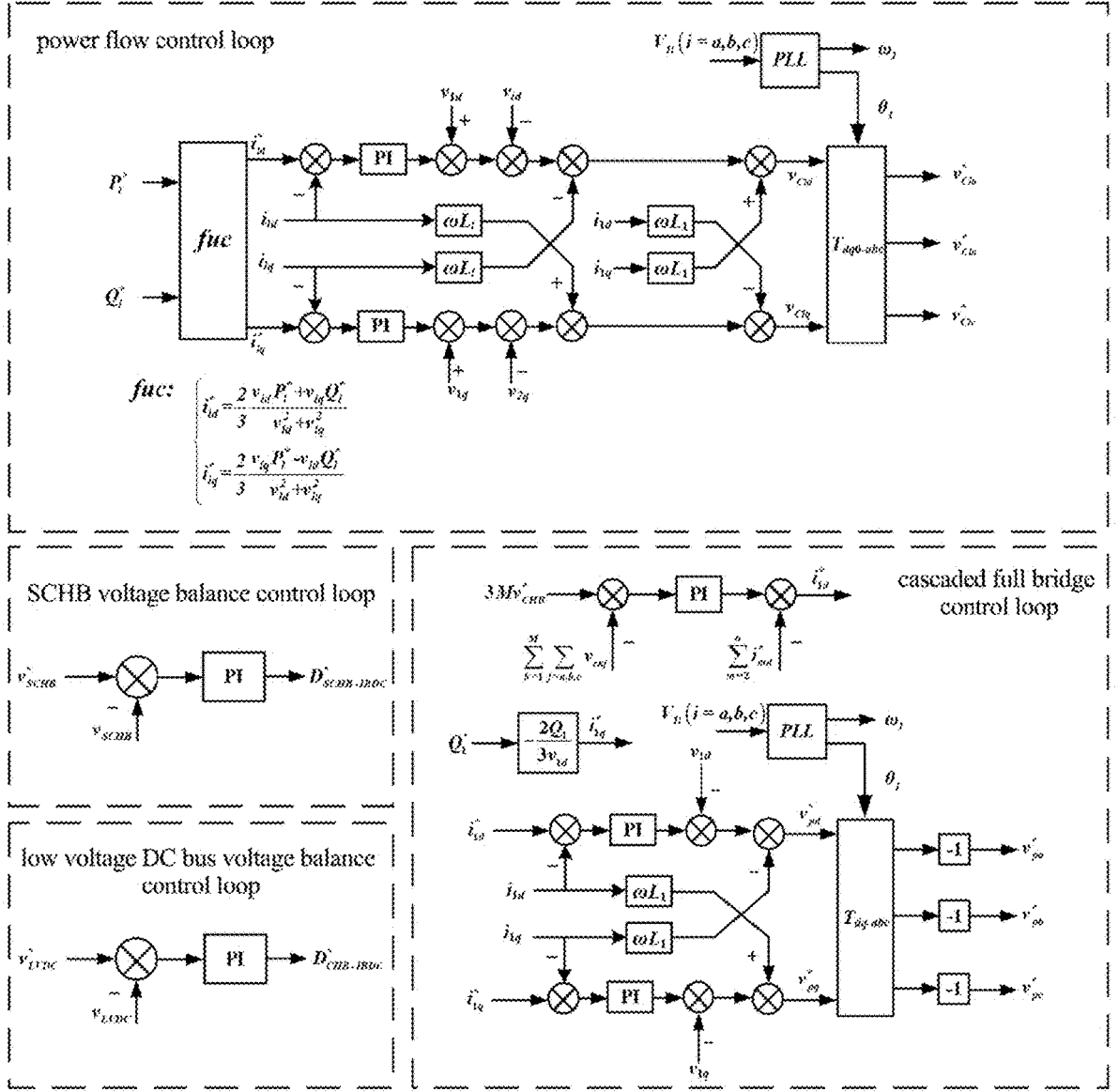
FIG. 4 is a block diagram of control strategy of the power electronic transformer shown in FIG. 3.

FIG. 4 is a block diagram of control strategy of a topological structure of a dual port power electronic transformer where second power conversion units use a full bridge topology, and first power conversion units use a dual active full bridge DC converter topology and implementation of interconnection of two AC feeder lines of the power electronic transformer provided in the second embodiment of the disclosure. As shown in FIG. 4, the control strategy of the power electronic transformer includes a power flow control loop, a cascaded full bridge control loop, a SCHB voltage balance control loop and a low voltage DC bus voltage balance control loop.

The power flow control loop calculates a d-axis component reference value $$i_{ld}^*$$

and a q-axis component reference value $$i_{lq}^*$$

of a current of the power flow control feeder line according to an active power reference value and a reactive power reference value of the power flow control feeder line, and the calculating method is as follows:

$$\begin{cases} i_{ld}^* = \frac{2}{3} \frac{v_{ld} P_l^* + v_{lq} Q_l^*}{v_{ld}^2 + v_{lq}^2} \\ i_{lq}^* = \frac{2}{3} \frac{v_{lq} P_l^* - v_{ld} Q_l^*}{v_{ld}^2 + v_{lq}^2} \end{cases}$$

wherein $$P_l^*$$

represents an active power reference value, and $$Q_l^*$$

represents a reactive power reference value.

Still further, the power flow control loop of the feeder line is performed in a dq coordinate system, and when the power of the feeder line is controlled, a d-axis current and a 9-axis current of the feeder line are coupled to each other, and also affected by disturbance of a node voltage of the feeder line and a node voltage of the feeder line 1, so these adverse effects on the control effect shall be eliminated.

More further, control is performed using a proportional integral (PI) controller, and the calculating method is as follows:

$$\begin{cases} v_{Cld}^*(s) = k_p(i_{ld}^* - i_{ld}) + \int k_i(i_{ld}^* - i_{ld}) + v_{1d}(s) - v_{ld}(s) - \omega L_l i_{lq}(s) + \omega L_1 i_{1q}(s) \\ v_{Clq}^*(s) = k_p(i_{lq}^* - i_{lq}) + \int k_i(i_{lq}^* - i_{lq}) + v_{1q}(s) - v_{lq}(s) - \omega L_l i_{ld}(s) + \omega L_1 i_{1d}(s) \end{cases}$$

wherein $v_{cld}$* and $v_{Clq}$* are multiplied by a Parker inverse transformation matrix to obtain output reference voltages $$\vec{V}_{Clj}^{*}$$

i.e., $$\vec{V}_{Cla}^{*}$$

$$\vec{V}_{Clb}^{*}$$

and $$\vec{V}_{Clc}^{*}$$

of the power flow control of the feeder line in a abc coordinate system, $v_1$ is an AC voltage on the feeder line 1, $i_l$ is an AC current on the feeder line 1, $v_l$ is an AC voltage on the feeder line 1, $i_l$ is an AC voltage on the feeder line 1, $\omega$ represents an AC frequency of the feeder line, L represents an equivalent inductance value of the feeder line, a lower index d represents a d-axis component, a lower index q represents a q-axis component, an upper index * represents a reference value, $k_p$ is a gain coefficient in a proportional element of the PI controller, and $k_i$ is a gain coefficient in an integral element of the PI controller.

Preferably, the cascaded full bridge control loop includes an outer voltage loop, a reactive outer loop and an inner current loop. The outer voltage loop controls a sum of capacitor voltages of the second submodule, inputs a deviation between the actual value and the reference value into an PI regulator, calculates to obtain the d-axis current of the CHB, and then makes a difference with the d-axis current of the feeder line 2 to obtain a reference voltage $$i_{1d}^{*}$$

of the inner current loop. The reactive outer loop is configured to regulate a reactive power of the feeder line 1, the controller outputs a reference voltage $$i_{1q}^{*}$$

of the inner current loop, and the calculating method is as follows:

$$i_{1q}^{*} = -\frac{2}{3}\frac{Q_1^{*}}{v_{1d}}$$

wherein $$Q_1^{*}$$

represents a reactive power reference value of the feeder line 1, and $v_{1d}$ represents a d-axis component of an AC voltage on the feeder line 1.

Even further, d-axis and q-axis current sampling values of the feeder line 1 and d-axis and q-axis current reference values of the feeder line 1 are inputted into the PI regulator, respectively, and coupling compensation items $\omega L_1 L_{1q}$ and $\omega L_1 L_{1d}$ of the current are added to achieve current decoupling control, thereby obtaining output voltage dq-axis reference values $$v_{pd}^{*}$$

and $$v_{pq}^{*}$$

of the CHB. Coordinate system transformation of dq-abc using the Parker inverse transformation matrix may obtain output reference values $$v_{pa}^{*}$$

$$v_{pb}^{*}$$

and $$v_{pc}^{*}$$

of the CHB in the abc coordinate system, and the calculating method is as follows:

$$\begin{cases} v_{pd}(s) = -k_p(i_{1d}^{*} - i_{1d}) - \int k_i(i_{1d}^{*} - i_{1d}) + v_{1d}(s) + \omega L_1 i_{1q}(s) \\ v_{pq}(s) = -k_p(i_{1q}^{*} - i_{1q}) - \int k_i(i_{1q}^{*} - i_{1q}) + v_{1q}(s) - \omega L_1 i_{1d}(s) \end{cases}$$

Even more further, after obtaining the output voltage reference values of the CHB, output voltage reference values of each phase submodule of the CHB may be calculated and obtained from the following formula:

$$v_{ckj}^{*} = \frac{v_{pj}^{*}}{M}(k = 1, 2, \ldots, M; j = a, b, c)$$

11                                                           12

When the IBDC is a dual active full bridge converter, the SCHB voltage balance control loop and the low voltage DC bus voltage balance control loop include:

control of a low voltage DC bus capacitor voltage uses single phase shift (SPS) modulation, where control object of the IBDC is to regulate an active power flowing into a low voltage DC bus capacitor, thereby maintaining stability of the capacitor voltage $V_{LVDC}$.

Still further, control of a SCHB capacitor voltage uses single phase shift (SPS) modulation, where control object of the third submodule is to regulate an active power flowing out of a capacitor connected in series to the first submodule, thereby maintaining stability of the capacitor voltage $V_{SCHB}$.

Figure 5:
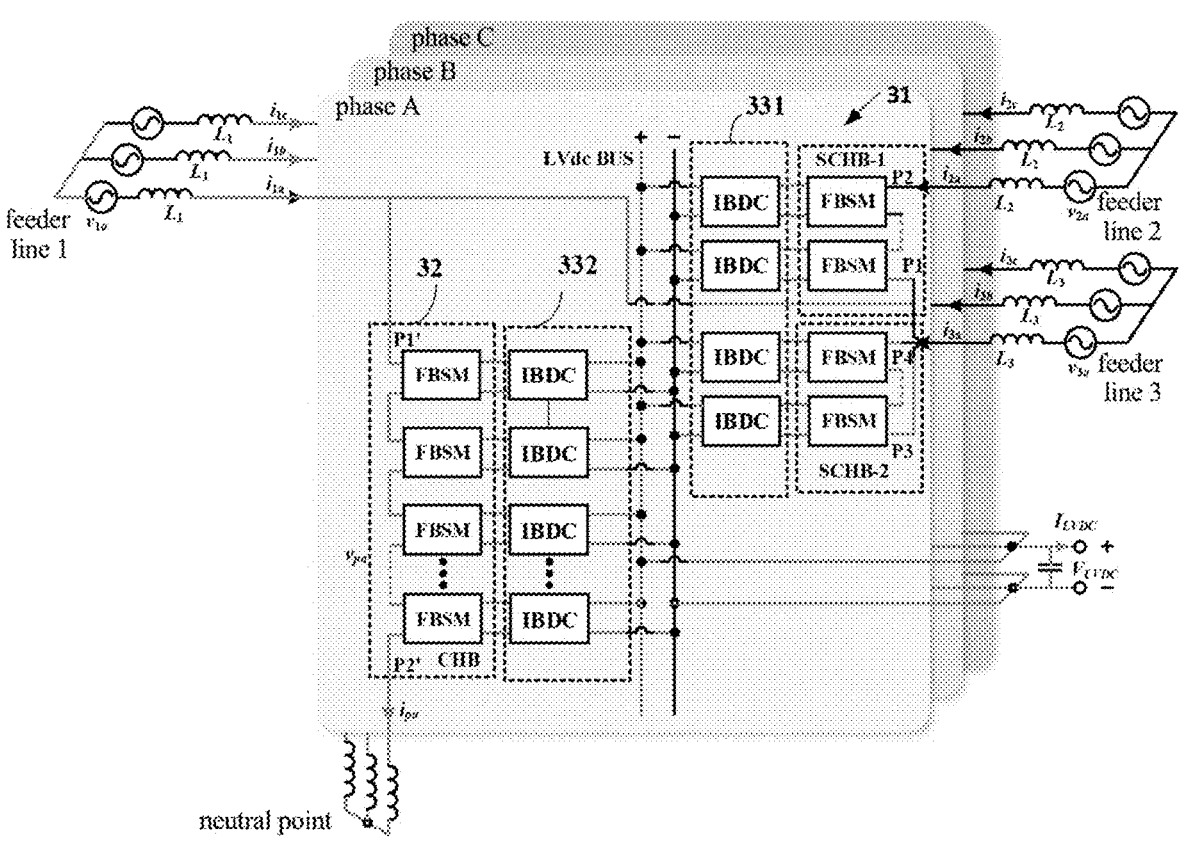
FIG. 5 is a structural diagram of a power electronic transformer provided in a third embodiment of the disclosure.

FIG. 5 is a structural diagram of a power electronic transformer 30 provided in a third embodiment of the disclosure. As shown in FIG. 5, the power electronic transformer 30 is used to achieve power flow control of three feeder lines and a topology of low voltage DC joint powering devices and system connection. In this embodiment, the power electronic transformer 30 includes three modules, which correspond to phase A, phase B and phase C, respectively, and the three modules each include three submodules, which are a first submodule 31, a second submodule 32 and a third submodule, respectively. The first submodule 31 includes N second power conversion units, and the second submodule 32 includes M second power conversion units. The third submodule includes a first power conversion module 331 and a second power conversion module 332. The first power conversion module 331 includes N first power conversion units, and the second power conversion module 332 includes M first power conversion units. Structures and connection relations of the second submodule 32 and the third submodule are substantially the same as that in the second embodiment.

In this embodiment, the first submodule 31 includes two SCHBs, which are SCHB-1 and SCHB-2, respectively, and SCHB-1 has the same structure as the SCHB structure in the second embodiment. SCHB-2 includes a second input port, P output ports and P second power conversion units, where P is an integer greater than 0, the second power conversion units are full bridge sub-modules (FBSM), P second power conversion units have input ports connected in series to form the second input port of the first submodule 31, and output ports to form the P output ports of the first submodule 31, and the second input port of the first submodule 31 of the three modules has one terminal P4 connected to three phases of a third three-phase AC current in one-to-one correspondence, and the other terminal P3 connected to three phases of the first three-phase AC current in one-to-one correspondence, and the third three-phase AC current corresponds to feeder line 3. In other embodiments, the first submodule of the power electronic transformer may also include more SCHBs to achieve power flow control of multiple feeder lines and a topology of low voltage DC joint powering devices and system connection, but the disclosure is not limited thereto.

In the third embodiment, the first power conversion module 331 further includes P first power conversion units having input ports connected to the P output ports of the first submodule 31 in one-to-one correspondence, and output ports connected in parallel to the low voltage DC bus.

Control strategy of the power electronic transformer 30 of this embodiment is the same as that in the second embodiment, and for details, please refer to FIG. 4.

Hereinafter application of structures and methods in the above embodiments are further explained with reference to specific simulation examples.

Combining with the above embodiments, hereinafter simulation verification is performed on the system using MATLAB/Simulink software, and simulation parameters are shown in Table 1.

TABLE 1

| Simulation Parameters of Power Electronic Transformer | | | |
|---|---|---|---|
| Parameter | Value | Parameter | Value |
| Feeder line capacity | 3 MVA | Low voltage DC bus voltage | 750 V |
| Medium voltage AC feeder line voltage | 10 kV | SCHB Submodule capacitance | 1.6 mF |
| Feeder line equivalent inductance | 10.61 mH | CHB Submodule capacitance | 1.6 mF |
| CHB submodule voltage | 800 V | Low voltage DC bus capacitance | 4 mF |
| CHB cascaded number | 12 | SCHB module switching frequency | 3 kHz |
| SCHB submodule voltage | 800 V | CHB module switching frequency | 3 kHz |
| SCHB cascaded number | 3 | IBDC switching frequency | 3 kHz |

The power electronic transformer 30 is connected to three feeder lines, as for a schematic diagram of connection, please refer to FIG. 5, and as for a control method in the simulation examples, please refer to FIG. 4. The power electronic transformer 30 includes active powers and reactive powers on the two SCHB control feeder lines (the feeder line 2 and the feeder line 3), the feeder line 1 is a balance feeder line, and can balance the active powers of other feeder lines and the low voltage DC bus load, and the corresponding control loop is a power flow control loop of the feeder line. The reactive power of the feeder line 1 is controlled by the second submodule 32, balance of the capacitor voltage of the second submodule 32 is controlled by an amplitude and a phase of the second submodule 32, and the corresponding control loop is a cascaded full bridge control loop. The first power conversion units connected to the second power conversion units of the SCHB control balance of the SCHB capacitor voltage, and the corresponding control loop is a SCHB voltage balance control loop. The first power conversion units connected to the second power conversion units of the second submodule 32 control balance of the low voltage DC bus capacitor voltage, and the corresponding control loop is a low voltage DC bus voltage balance control loop.

To verify active power flow control capability of the hybrid transformer, simulation sets three operating cases.

Case 1: the feeder line 1 neither emits nor absorbs the reactive power, the feeder line 2 emits 0.3 p.u. active power, and neither emits nor absorbs the reactive power, the feeder line 3 emits 0.3 p.u. active power, and neither emits nor absorbs the reactive power, and the low voltage DC bus absorbs 0.9p.u.

Case 2: the feeder line 1 neither emits nor absorbs the reactive power, the feeder line 2 emits 0.3 p.u. active power, and absorbs 0.1 p.u. reactive power, the feeder line 3 emits 0.4 p.u. active power, and neither emits nor absorbs the reactive power, and the low voltage DC bus absorbs 0.9p.u.

Case 3: the feeder line 1 neither emits nor absorbs the reactive power, the feeder line 2 emits 0.3 p.u. active power, and absorbs 0.3 p.u. reactive power, the feeder line 3 emits 0.4 p.u. active power, and emits 0.1 p.u. reactive power, and the low voltage DC bus absorbs 0.9p.u.

Figure 6:
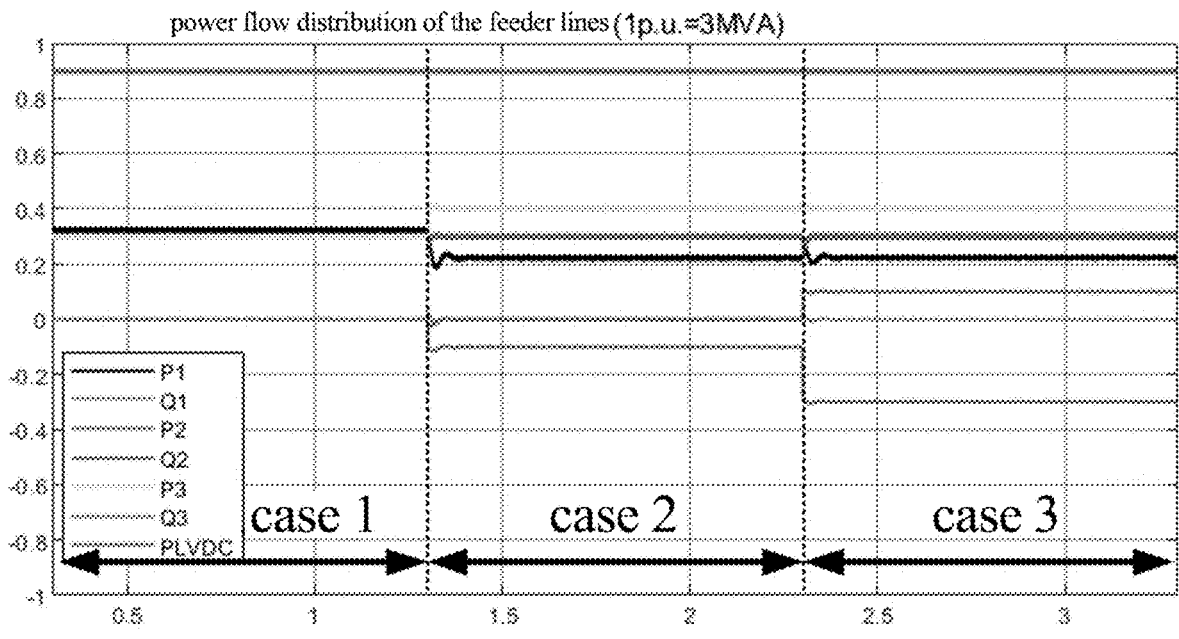
FIG. 6 are waveform diagrams of powers for power flow control of respective feeder lines and joint supply to a low voltage DC bus of the power electronic transformer in three cases provided in the disclosure.
Figure 7:
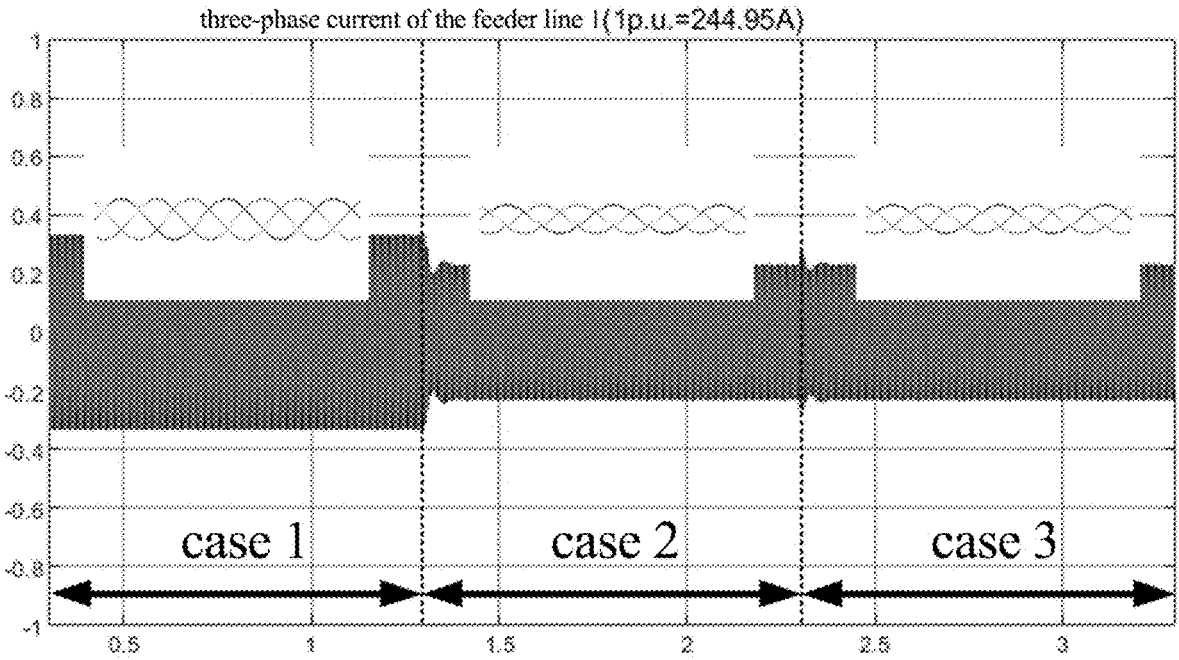
FIG. 7 is a waveform diagram of a current of a feeder line 1 of the power electronic transformer in three cases provided in the disclosure.
Figure 8:
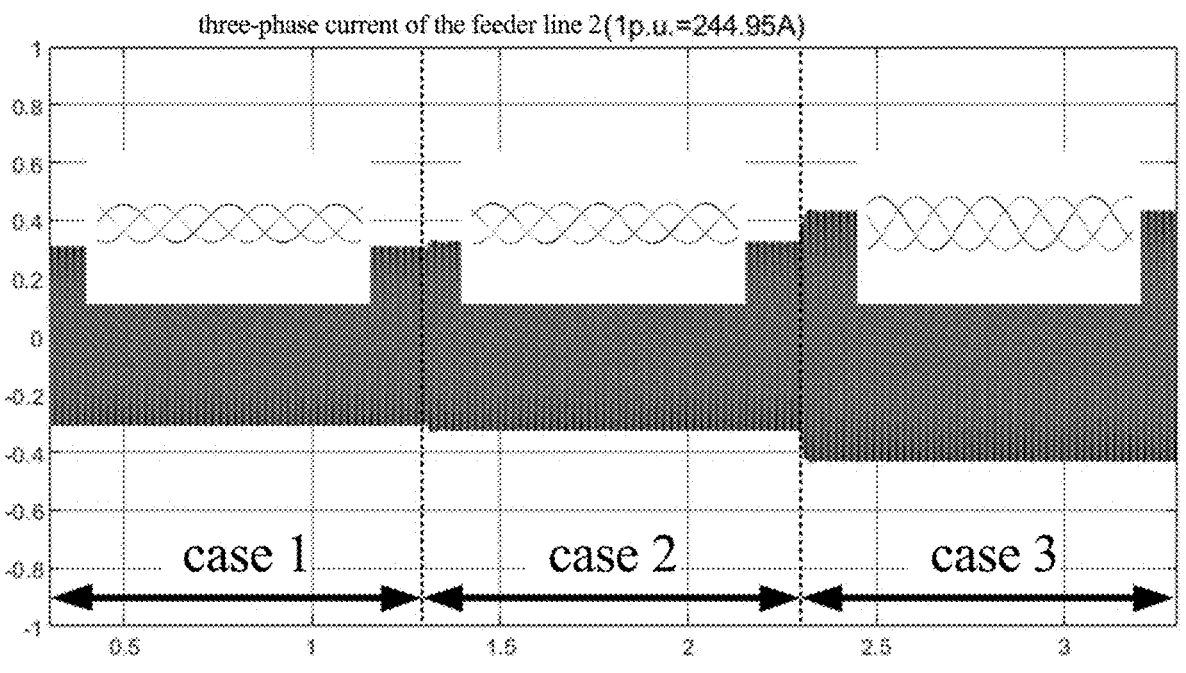
FIG. 8 is a waveform diagram of a current of a feeder line 2 of the power electronic transformer in three cases provided in the disclosure.
Figure 9:
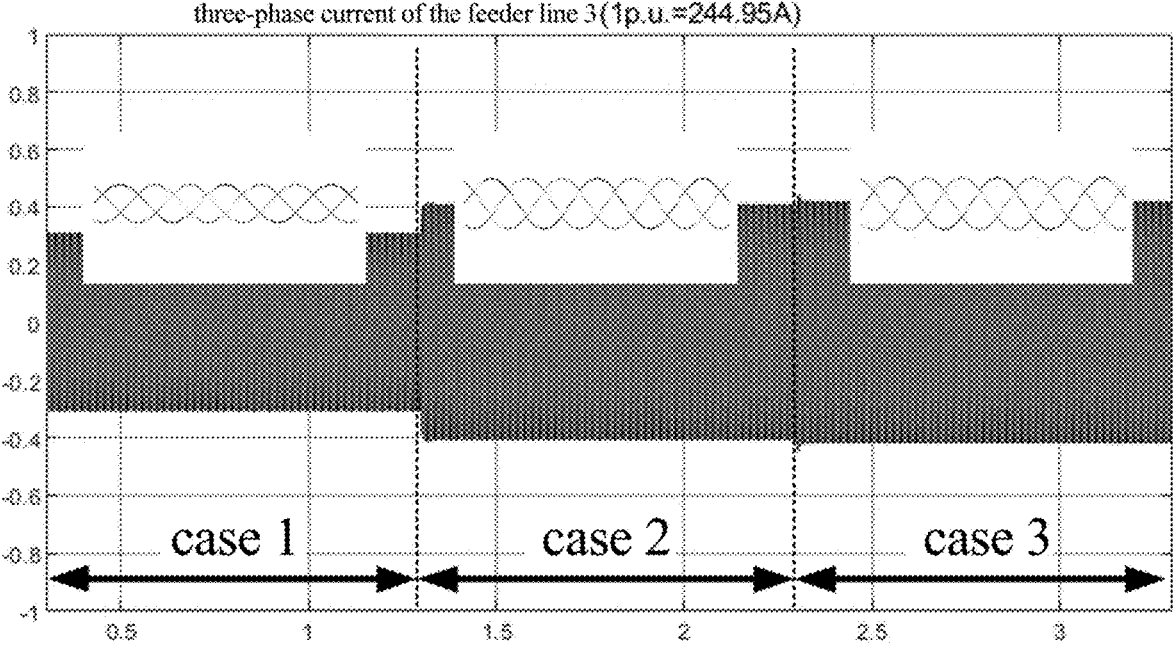
FIG. 9 is a waveform diagram of a current of a feeder line 3 of the power electronic transformer in three cases provided in the disclosure.
Figure 10:
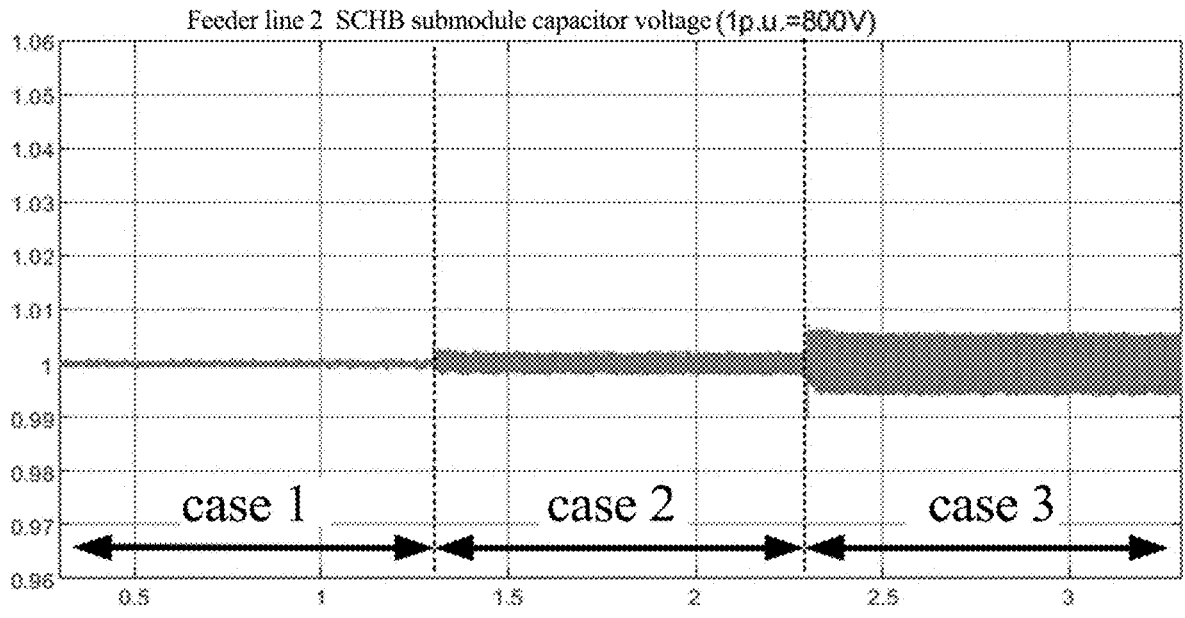
FIG. 10 is a waveform diagram of a SCHB submodule capacitor voltage on the feeder line 2 of the power electronic transformer in three cases provided in the disclosure.
Figure 11:
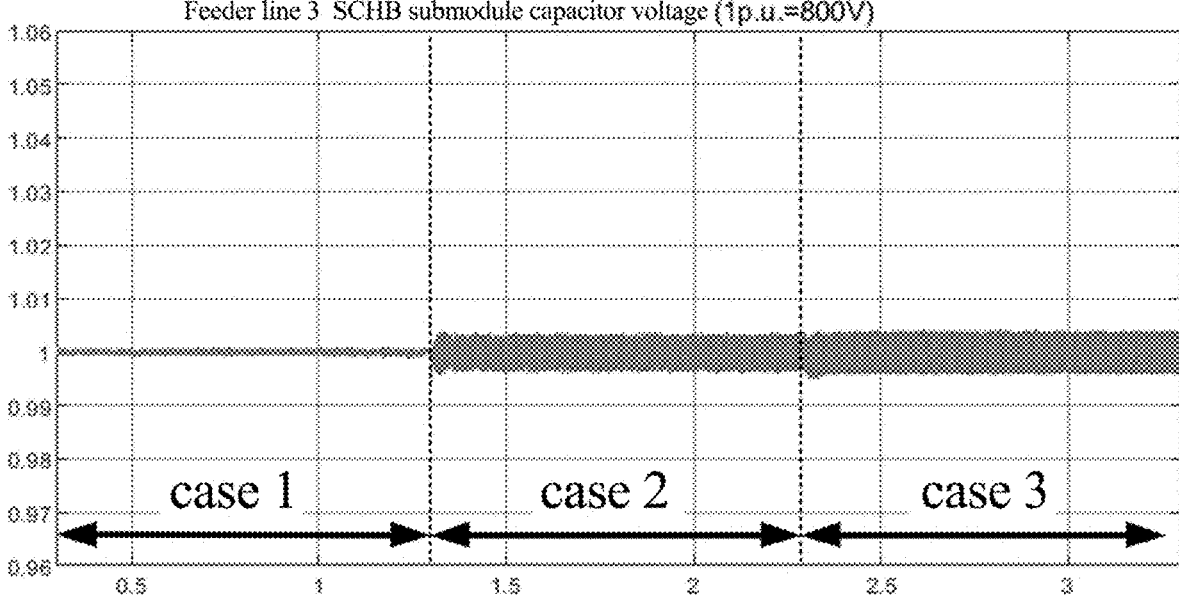
FIG. 11 is a waveform diagram of the SCHB submodule capacitor voltage on the feeder line 3 of the power electronic transformer in three cases provided in the disclosure.
Figure 12:
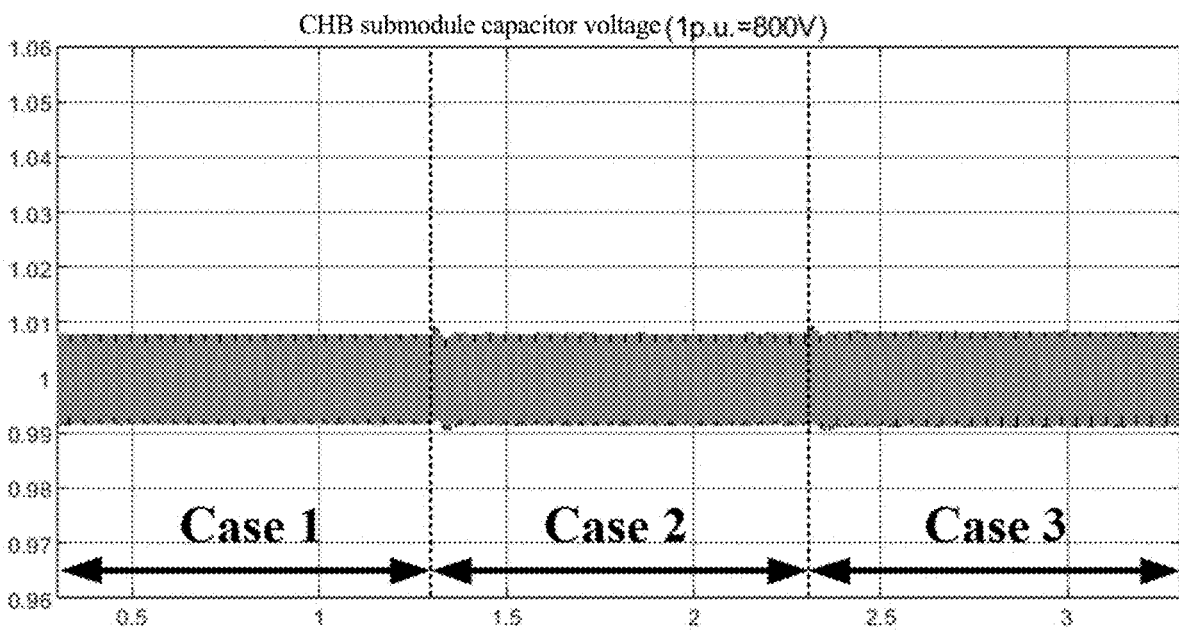
FIG. 12 is a waveform diagram of a CHB submodule capacitor voltage of the power electronic transformer in three cases provided in the disclosure.
Figure 13:
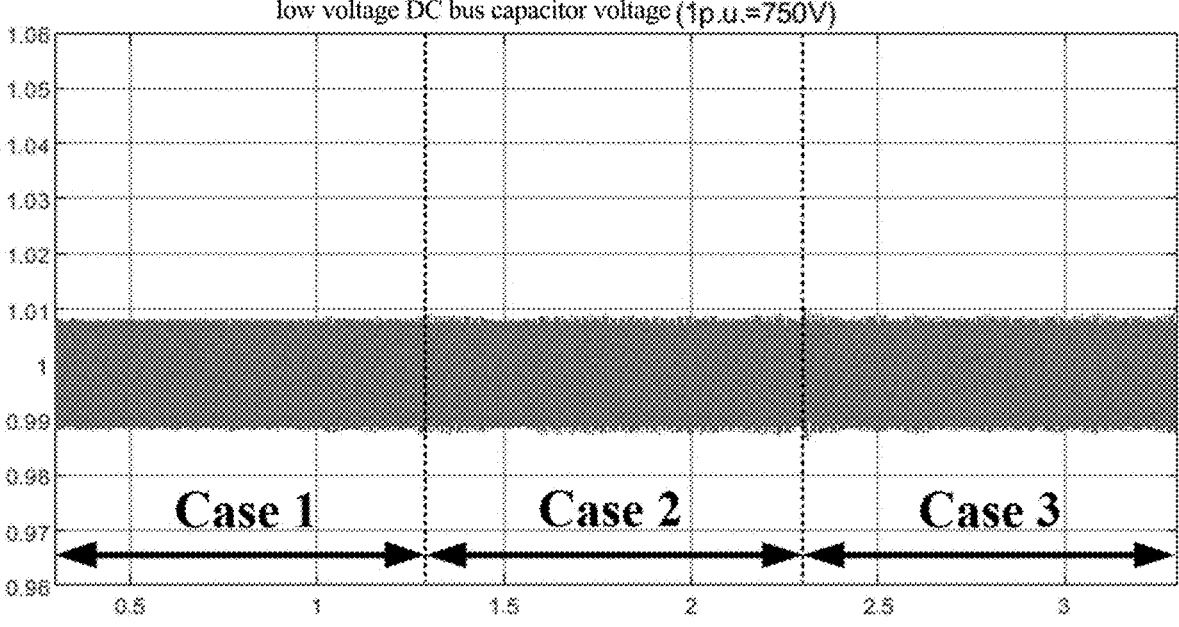
FIG. 13 is a waveform diagram of a low voltage DC bus capacitor voltage of the power electronic transformer in three cases provided in the disclosure.

FIG. 6 is an simulation result of power flow control of respective feeder lines and joint supply to a low voltage DC bus of the power electronic transformer in three cases, including a waveform diagram of an active power $P_1$ of the feeder line 1, a waveform diagram of a reactive power $Q_1$ of the feeder line 1, a waveform diagram of an active power $P_2$ of the feeder line 2, a waveform diagram of a reactive power $Q_2$ of the feeder line 2, a waveform diagram of an active power $P_3$ of the feeder line 3, a waveform diagram of a reactive power $Q_3$ of the feeder line 3, and a waveform diagram of an active power of the low-voltage DC bus $P_{LVDC}$. FIG. 7 is a waveform diagram of a current of a feeder line 1 of the power electronic transformer in three cases. FIG. 8 is a waveform diagram of a current of a feeder line 2 of the power electronic transformer in three cases. FIG. 9 is a waveform diagram of a current of a feeder line 3 of the power electronic transformer in three cases. FIG. 10 is a waveform diagram of a SCHB submodule capacitor voltage of the feeder line 2 of the power electronic transformer in three cases. FIG. 11 is a waveform diagram of a SCHB submodule capacitor voltage of the feeder line 3 of the power electronic transformer in three cases. FIG. 12 is a waveform diagram of a CHB submodule capacitor voltage of the power electronic transformer in three cases. FIG. 13 is a waveform diagram of a low voltage DC bus capacitor voltage of the power electronic transformer in three cases.

The simulation waveform result shows that in the case of being connected to three power transmission lines, the power electronic transformer achieves decoupling active power flow control of the active powers and the reactive powers on the feeder lines, capability of joint supply to the low-voltage direct current while also keeping internal energy balance of the device, i.e., ensures capacitor voltage stability and supports port expansion.

Figure 14:
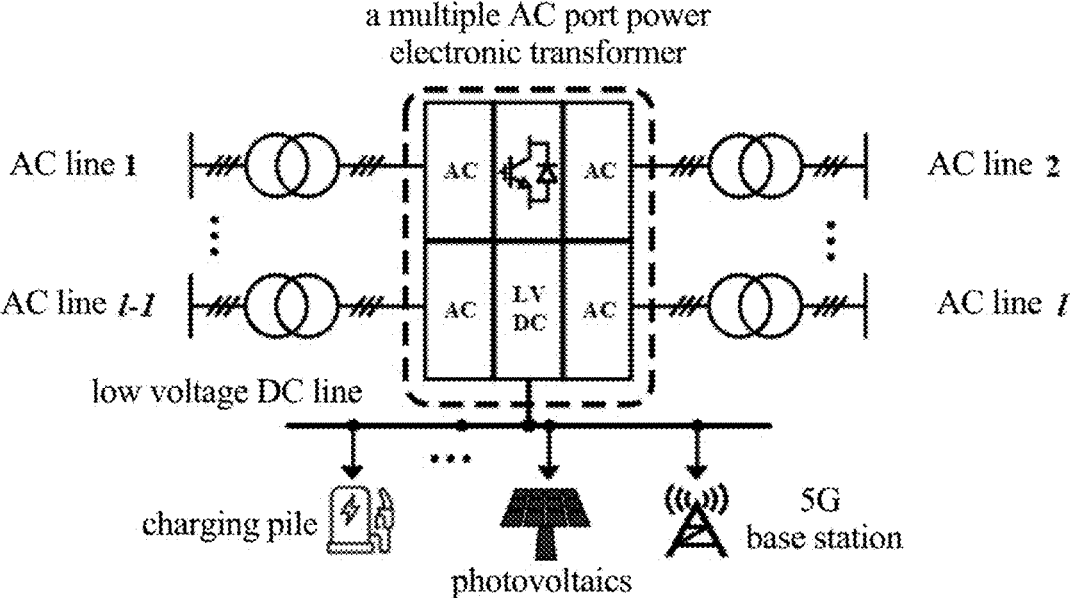
FIG. 14 is a schematic diagram of an AC/DC hybrid power distribution network system in interconnection of multiple medium voltage AC ports of the power electronic transformer provided in the disclosure.

FIG. 14 is a schematic diagram of an AC/DC hybrid power distribution network system including the power electronic transformer in interconnection of multiple medium voltage AC ports provided in the disclosure. As shown in FIG. 14, the power electronic transformer provides multiple AC ports, which correspond to an AC line 1 to an AC line 1, respectively, and achieves interconnection between the respective AC ports, and one end of the isolated DC-DC converters is connected in parallel to form a low voltage DC feeder line, which achieves joint supply to the low voltage DC side, such that large power DC loads such as charging stations, optoelectronics, and base stations are connected to the power distribution network, and operational reliability of the low voltage DC power distribution network is improved.

The first submodule of the power electronic transformer in the disclosure provides multiple AC ports, achieves interconnection between the respective AC ports, and can make decoupling control of powers between the feeder lines by regulating a magnitude of series voltage sources to achieve interconnection and mutual assistance of the AC ports, thereby facilitating efficient operation of the power distribution network, and flexibly expandable, flexibly controllable and control decoupling operation of the multiple ports; in the disclosure, DC sides of the respective second power conversion units of the second submodule and the first submodule are connected to one end of the isolated DC-DC converters, and the other end of the isolated DC-DC converters is connected in parallel to form a low voltage DC bus, which achieves joint supply to the low voltage DC side, and improves operational reliability of the low voltage DC power distribution network; the first submodule in the disclosure uses modular design, which may achieve expansion of the AC ports by increasing the number of SCHBs, and achieve rapidity and economy of expansion of the AC ports; the SCHBs in the disclosure use small power cascaded full bridge design, which reduces a voltage level of the DC side, such that the devices can select a lower voltage withstand level, so as to facilitate more economical and safer operation of the power distribution network; the SCHBs in the disclosure enable the disclosure to be applied to a power distribution network with a higher voltage level by the way of increasing cascaded full bridges.

Those skilled in the art shall understand that the embodiments of the application may provide a method, a system, or a computer program product. Therefore, the application may use the form of full hardware embodiments, full software embodiments or embodiments combining software and hardware. Moreover, the application may use the form of a computer program product implemented on one or more computer readable storage mediums (including but not limited to disk memory, CD-ROM, optical memory, or the like) containing computer usable program codes. The solution in the embodiments of the application can be implemented using various computer languages, for example, object-oriented program design language Java and literal scripting language JavaScript.

The application is described with reference to the flow diagram and/or the block diagram of the method, the equipment (system) and the computer program product in the embodiments of the application. It shall be understood that each flow and/or block in the flow diagram and/or the block diagram, and a combination thereof may be implemented by the computer program instructions. These computer program instructions also may be provided to general-purpose computers, application specific computers, embedded processors or processors for other programmable data processing equipment to produce a machine, such that the instructions executed by the computers or processors for other programmable data processing equipment produce a device for achieving specific functions in one or more flows of the flow diagram and/or one or more blocks of the block diagram.

These computer program instructions also may be stored in a computer readable memory that can guide the computers or other programmable data processing equipment to work in a specific way, such that the instructions stored in the computer readable memory produce a product including the instruction device, which achieves specific functions in one or more flows of the flow diagram and/or one or more blocks of the block diagram.

These computer program instructions also may be loaded onto the computers or other programmable data processing equipment to execute a series of operation steps on the computers or other programmable equipment to produce processing implemented by the computers, such that the instructions executed on the computers or other programmable data processing equipment provide steps for achieving the specific functions in one or more flows of the flow diagram and/or one or more blocks of the block diagram.

Although the preferable embodiments of the application have been described, once those skilled in the art know the basic inventive concept, these embodiments may have additional changes and modifications. Therefore, the appended claims intend to interpret to include the preferable embodiments and all changes and modifications falling into the scope of the application.

Obviously, those skilled in the art can make various alternations and variations to the application without departing from spirit and scope of the application. In such way, if these modifications and variations to the application are within the scope of the claims and equivalent techniques of the application, the application also intends to include these alternations and variations.

What is claimed is:

1. A power electronic transformer, comprising three modules, the three modules each comprising:
   a first submodule comprising a first input port and N output ports, where N is an integer greater than 0;
   a second submodule comprising a first input port and M output ports, where M is an integer greater than 0; and
   a third submodule comprising a first power conversion module and a second power conversion module,
   the first power conversion module comprises N first power conversion units having input ports connected to the N output ports of the first submodule in one-to-one correspondence,
   the second power conversion module comprises M first power conversion units having input ports connected to the M output ports of the second submodule in one-to-one correspondence,
   the first input port of the first submodule of the three modules has one terminal connected to three phases of a first three-phase alternating current in one-to-one correspondence, and an other terminal connected to three phases of a second three-phase alternating current in one-to-one correspondence,
   the first input port of the second submodule of the three modules has one terminal connected to three phases of the first three-phase alternating current in one-to-one correspondence, and an other terminal connected to a neutral point, and
   output ports of the N first power conversion units of the three modules are connected in parallel to output ports of the M first power conversion units to form a DC bus for powering a load.

2. The power electronic transformer according to claim 1, wherein the first submodule comprises N second power conversion units having input ports connected in series to form the first input port of the first submodule, and output ports to form the N output ports of the first submodule.

3. The power electronic transformer according to claim 1, wherein the second submodule comprises M second power conversion units having input ports connected in series to form the first input port of the second submodule, and output ports to form the M output ports of the second submodule.

4. The power electronic transformer according to claim 1, wherein,
   the first submodule further comprises a second input port, P output ports and P second power conversion units, where P is an integer greater than 0, and the P second power conversion units have input ports connected in series to form the second input port of the first submodule, and output ports to form the P output ports of the first submodule,
   the second input port of the first submodule of the three modules has one terminal connected to three phases of a third three-phase alternating current in one-to-one correspondence, and the other terminal connected to three phases of the first three-phase alternating current in one-to-one correspondence,
   the first power conversion module further comprises P first power conversion units having input ports connected to the P output ports of the first submodule in one-to-one correspondence, and
   the P first power conversion units of the three modules have output ports connected in parallel to the DC bus.

5. The power electronic transformer according to claim 1, wherein the first power conversion units are isolated DC-DC converters.

6. The power electronic transformer according to claim 5, wherein the first power conversion units are isolated bidirectional DC-DC converters.

7. The power electronic transformer according to claim 1, wherein the first power conversion units are dual active full bridge DC-DC converters.

8. The power electronic transformer according to claim 1, wherein the first power conversion units are half-bridge DC-DC converters.

9. The power electronic transformer according to claim 2, wherein the second power conversion units are full bridge converters.

10. The power electronic transformer according to claim 3, wherein the second power conversion units are full bridge converters.

11. The power electronic transformer according to claim 4, wherein the second power conversion units are full bridge converters.

12. The power electronic transformer according to claim 1, wherein the second submodule is a voltage source converter.

* * * * *